United States Patent
Awad Alla et al.

(10) Patent No.: US 11,158,139 B2
(45) Date of Patent: Oct. 26, 2021

(54) VEHICLE TELEMATICS SYSTEM

(71) Applicant: Ford Global Technologies, LLC, Dearborn, MI (US)

(72) Inventors: Michael Awad Alla, Novi, MI (US); Ray C. Siciak, Ann Arbor, MI (US); Tsung-Han Tsai, Ypsilanti, MI (US); Dhanunjay Vejalla, Novi, MI (US); Bo Wu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 16/524,478

(22) Filed: Jul. 29, 2019

(65) Prior Publication Data

US 2021/0035376 A1 Feb. 4, 2021

(51) Int. Cl.
*G07C 5/00* (2006.01)
*B60R 16/033* (2006.01)
*G08G 1/0967* (2006.01)

(52) U.S. Cl.
CPC ............ *G07C 5/008* (2013.01); *B60R 16/033* (2013.01); *G08G 1/096775* (2013.01)

(58) Field of Classification Search
CPC .... G07C 5/008; G07C 5/0841; B60R 16/033; G08G 1/096775; H04L 67/12
See application file for complete search history.

(56) References Cited

U.S. PATENT DOCUMENTS

| | | | |
|---|---|---|---|
| 2005/0065716 A1* | 3/2005 | Timko | G01S 19/16 701/29.3 |
| 2014/0278837 A1* | 9/2014 | Blumer | G07B 15/00 705/13 |
| 2018/0047219 A1* | 2/2018 | Buswell | G07C 5/0808 |

FOREIGN PATENT DOCUMENTS

| | | |
|---|---|---|
| KR | 20070006128 A | 1/2007 |
| KR | 20070006133 A | 1/2007 |
| KR | 101168398 B1 | 7/2012 |

* cited by examiner

*Primary Examiner* — Marthe Y Marc-Coleman
(74) *Attorney, Agent, or Firm* — Frank A. MacKenzie; Bejin Bieneman PLC

(57) ABSTRACT

A method including determining a status of a power supply of a first telematics control unit (TCU) as one of active or inactive, the first TCU programmed to communicate with a server via a network, determining a status of a second TCU in communication with the first TCU via a vehicle network, the second TCU is programmed to communicate with the server via the network, and determining a risk condition based on the statuses of the power supply and the second TCU. The risk condition is a measure of severity of an inactive status.

20 Claims, 2 Drawing Sheets

VEHICLE TELEMATICS SYSTEM

BACKGROUND

A vehicle computer may be programmed to determine a risk condition based on a status of one or more components and/or systems of a vehicle. The vehicle computer may determine different risk conditions based on different combinations of statuses of the vehicle components and/or systems. The vehicle computer may be programmed to perform countermeasures to address or manage the risk condition.

DETAILED DESCRIPTION

Figure 1:
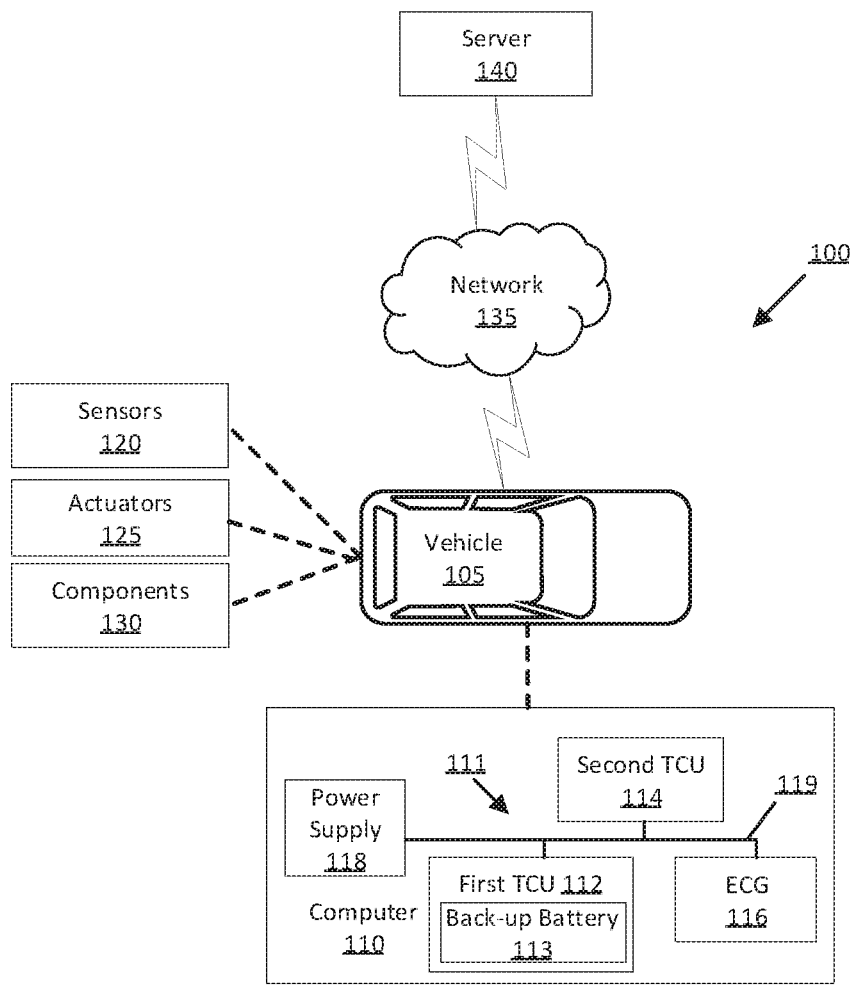
FIG. 1 is a block diagram of an example system for determining a risk condition in a vehicle telematics subsystem.

A method includes determining a status of a power supply of a first telematics control unit (TCU) as one of active or inactive, the first TCU being programmed to communicate with a server via a network, determining a status of a second TCU in communication with the first TCU via a vehicle network, the second TCU being programmed to communicate with the server via the network, and determining a risk condition based on the statuses of the power supply and the second TCU, the risk condition is a measure of severity of an inactive status.

The first TCU may include a back-up battery.

The method can include, upon detecting the power supply is inactive, activating the back-up battery.

The method can include detecting the status of the second TCU from a message from the second TCU.

The method can include detecting a status of the vehicle network and determining the risk condition further based on the status of the vehicle network.

The method can include detecting the status of the vehicle network from a message from the second TCU.

The method can include detecting a status of an enhanced central gateway (ECG) in communication with the first TCU via the vehicle network and determining the risk condition further based on the status of the ECG. The ECG is programmed to facilitate communication between multiple communication protocols via the vehicle network.

The method can include detecting the status of the ECG from a message from the ECG.

The method can include transmitting data indicating the risk condition to the server via one of the first TCU or the second TCU.

The method can include actuating vehicle components based on the risk condition.

A system can comprise a compute include a processor and a memory, the memory storing instructions executable by the processor to determine a status of a power supply of a first telematics control unit (TCU) as one of active or inactive, the first TCU being programmed to communicate with a server, determine a status of a second telematics control unit (TCU) in communication with the first TCU via a vehicle network, the second TCU being programmed to communicate with the server, and determine a risk condition based on the statuses of the power supply and the second TCU, the risk condition is a measure of severity of an inactive status.

The first TCU can include a back-up battery.

The instructions can further include instructions to upon detecting the power supply is inactive, activate the back-up battery.

The instructions can further include instructions to detect the status of the second TCU from a message from the second TCU.

The instructions can further include instructions to detect a status of the vehicle network and determine the risk condition further based on the status of the vehicle network.

The instructions can further include instructions to detect the status of the vehicle network from a message from the second TCU.

The instructions can further include instructions to detect a status of an enhanced central gateway (ECG) in communication with the first TCU via the vehicle network and determine the risk condition further based on the status of the ECG. The ECG is programmed to facilitate communication between multiple communication protocols via the vehicle network The instructions can further include instructions to detect the status of the ECG from a message from the ECG.

The instructions can further include instructions to transmit data indicating the risk condition to the server via one of the first TCU or the second TCU.

The instructions can further include instructions to actuate vehicle components based on the risk condition.

Further disclosed herein is a computing device programmed to execute any of the above method steps. Yet further disclosed herein is a computer program product, including a computer readable medium storing instructions executable by a computer processor, to execute an of the above method steps.

FIG. 1 illustrates an example system 100 for determining a risk condition in a vehicle 105 telematics subsystem 111. The system 100 includes a vehicle 105 computer 110 programmed to determine a status of a power supply 118 of a first telematics control unit (TCU) 112 as one of active or inactive, and to determine a status of a second telematics control unit (TCU) 114 in communication with the first TCU 112 via a vehicle network 119. The vehicle computer 110 is further programmed to determine a risk condition based on the statuses of the power supply 118 and the second TCU 114. A vehicle computer 110 may be programmed to identify a risk condition based on a status of one or more components of a vehicle 105 subsystem and to initiate countermeasures based on the risk condition. The vehicle computer 110 may determine a risk condition for the vehicle 105 subsystem when any component of the subsystem has an inactive status. That is, the vehicle computer 110 may determine the same risk condition for a vehicle 105 subsystem regardless of which component has an inactive status. Advantageously, the vehicle computer 110 determines a risk condition for the telematics subsystem 111 based on the component of the telematics subsystem 111 that has an inactive status, which allows the vehicle computer 110 to determine a more accurate or reliable risk condition and corresponding countermeasure.

A vehicle 105 includes the vehicle computer 110, sensors 120, actuators 125 to actuate various vehicle components 130, and the vehicle telematics subsystem 111. Via a network 135, the telematics subsystem 111 allows the vehicle computer 110 to communicate with a server 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission 130, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 130, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle network 119, the vehicle computer 110 may transmit messages to various devices in the vehicle 105 and/or receive messages (e.g., CAN messages) from the various devices, e.g., sensors 120, an actuator 125, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 120 may provide data to the vehicle computer 110 via the vehicle 105 communication network.

Vehicle 105 sensors 120 may include a variety of devices such as are known to provide data to the vehicle computer 110. For example, the sensors 120 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 120 fixed to vehicle 105 bumpers may provide data to provide locations of the objects, second vehicles 105, etc., relative to the location of the vehicle 105. The sensors 120 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 120. Thus, vehicles 105, as well as other items including as discussed below, fall within the definition of "object" herein.

The vehicle 105 actuators 125 are implemented via circuits, chips, or other electronic and or mechanical components that can actuate various vehicle subsystems in accordance with appropriate control signals as is known. The actuators 125 may be used to control components 130, including braking, acceleration, and steering of a vehicle 105.

The vehicle 101 can include a plurality of vehicle components 130. In the context of the present disclosure, a vehicle component 130 is one or more hardware components adapted to perform a mechanical or electro-mechanical function or operation—such as moving the vehicle 105, slowing or stopping the vehicle 105, steering the vehicle 105, etc. Non-limiting examples of components 130 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The system 100 can further include a network 135 connected to the server 140. The vehicle computer 110 can further be programmed to communicate with one or more remote sites such as the server 140, via the network 135. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An "active" status means that a component is operating within specified performance parameters. For example, the component may be active when the component is in communication with other components. An "inactive" status means that a component is either not operating or operating out of specified parameters. For example, the component may be inactive when the component is not in communication with other components when the component is specified to be communicating with other components. As another example, a component, e.g., a battery, is inactive when the component outputs, e.g., 2 volts to other components when the component is specified to output 12 volts to other components.

In the present context, a "risk condition" is a measure of a severity of an inactive status of a component in the vehicle 105. For example, an inactive status in the power supply 118 can have a higher risk condition than an inactive status in the second TCU 114. The risk condition can have an alphanumeric code, e.g., 1, 2, 3, etc., indicating the severity of the risk condition. For example, a risk condition of "3" can be more severe than a risk condition of "1." A risk condition of 1 may, for example, be associated with an inactive status of the second TCU 114. A risk condition of 2 or higher (e.g., 3, 4, etc.) may, for example, be associated with an inactive status of the power supply 118. The vehicle computer 110 may, for example, include a lookup table that lists the risk conditions associated with an inactive status in specific components, as shown below in Table 1. The vehicle computer 110 can match the inactive status of the identified component to the risk condition associated with the inactive status of the identified component.

TABLE 1

| Inactive Component | Risk Condition |
|---|---|
| First TCU 112 | 1 |
| Power Supply 118 | 2 (or higher) |
| Second TCU 114 | 1 |
| Vehicle network 119 | 2 (or higher) |
| Enhanced Central Gateway (ECG) 116 | 2 (or higher) |

The server 140 can be a conventional computing device, i.e., including one or more processors and one or more memories, programmed to provide operations such as disclosed herein. Alternatively, the server 140 may be a cloud-based server. Further, the server 140 can be accessed via the network 135, e.g., the Internet or some other wide area network. Upon receiving data identifying a risk condition from the vehicle computer 110, the server 140 may be programmed to respond based on the risk condition. For example, when the server 140 receives data indicating a risk condition with a value of 1 (continuing the example of Table 1), the server 140 may schedule maintenance for the vehicle 105, e.g., at a repair facility. As another example, when the server 140 receives data indicating a risk condition with a value of 2 or higher, the server 140 may direct assistance, e.g., a replacement vehicle, a tow truck, etc., to the vehicle's 105 location.

The vehicle computer 110 may include, or be communicatively coupled to, the telematics subsystem 111. The telematics subsystem 111 includes a plurality of TCUs in communication with each other via the vehicle network 119. Specifically, the telematics subsystem 111 includes the first TCU 112 and the second TCU 114 in communication with each other via the vehicle network 119. Additionally, the telematics subsystem 111 can include, e.g., a third TCU, a fourth TCU, etc. The adjectives "first," "second," "third," "fourth," are used throughout this document as identifiers and are not intended to signify importance or order.

The TCUs 112, 114 are micro-processor based computers. The TCUs 112, 114 include a processor and a memory as is known. The memory of the TCUs 112, 114 includes one or more forms of computer-readable media, and stores instructions executable by the processor performing various operations, including as disclosed herein. The TCUs 112, 114 allow communication between the vehicle 105 and the server 140. That is, the TCUs 112, 114 are programmed to communicate with the server 140 via the network. For example, the TCUs 112, 114 may transmit data, e.g., indicating the risk condition, to the server 140. The TCUs 112, 114 may communicate with and receive input from other vehicle computers over the above-mentioned vehicle network 119. The first TCU 112 and the second TCU 114 may transmit and receive data through the vehicle network 119 such as a controller area network (CAN) bus, Ethernet, WiFi, Local Interconnect Network (LIN), onboard diagnostics connector (OBD-II), and/or by any other wired or wireless communications network.

The first TCU 112 includes a back-up battery 113. The back-up battery 113 can be any type of power supply 118 suitable for providing electricity to operate the first TCU 112, e.g., a battery such as lithium-ion, lead-acid, etc.; a capacitor; etc. The output of the back-up battery 113 may be lower than that of a high voltage power source. For instance, the output of the back-up battery 113 may be on the order of 12 volts DC, in contrast to several hundred volts from a high-power source, e.g., of an electric or hybrid vehicle.

The telematics subsystem 111 includes an enhanced central gateway (ECG) 116 in communication with each TCU via the vehicle network 119. The ECG 116 is a microprocessor-based computer. The ECG 116 includes a processor and a memory as is known. The memory of the ECG 116 includes one or more forms of computer-readable media, and stores instructions executable by the processor performing various operations, including as disclosed herein. The ECG 116 schedules and performs communications between processors, e.g., the TCUs 112, 114 and one or more ECUs. The ECG 116 facilitates wired or wireless communication among the various processors in accordance with a number of communication protocols such as controller area network (CAN), a communication bus, Ethernet, WiFi, Local Interconnect Network (LIN), and/or other wired or wireless mechanisms. In other words, the ECG 116 translates messages from one communication protocol into another communication protocol to facilitate communication among various processors. That is, various processors communicating via various communication protocols may communicate with each other via the ECG 116. For example, the ECG 116 may receive a message from one ECU in a first communication protocol, e.g., LIN, translate the message into a second communication protocol, e.g., CAN, and transmit the message in the second communication protocol to the TCUs 112, 114.

The vehicle computer 110 includes a power supply 118 electrically coupled, i.e., providing power, to the telematics subsystem 111, i.e., the first TCU 112, the second TCU 114, and the ECG 116. The power supply 118 can be any type of power supply 118 suitable for providing electricity for operating the telematics subsystem 111, e.g., a battery such as lithium-ion, lead-acid, etc.; a capacitor; etc. The output of the power supply 118 is typically lower than that of a high voltage power source. For instance, the output of the power supply 118 may be on the order of 12 volts DC, in contrast to several hundred volts from a high-power source, e.g., of an electric or hybrid vehicle. The power supply 118 can supply a selectable voltage to loads such as the first TCU 112, the second TCU 114 and the ECG 116. The selectable voltage can be supplied to each processor separately.

The first TCU 112 can determine whether the power supply 118 is providing power to the first TCU 112. For example, the first TCU 112 can detect a voltage received from the power supply 118. The first TCU 112 can compare the voltage to a threshold. The voltage threshold is a minimum voltage to power the telematics subsystem 111. The threshold is determined based on the power requirements of the components of the telematics subsystem 111. In the case that the voltage is at or above the threshold, the first TCU 112 determines the power supply is providing power to the first TCU 112. Conversely, in the case that the voltage is below the threshold, the first TCU 112 determines that the power supply is not providing power to the first TCU 112. In the event the first TCU 112 does not receive power from the power supply 118, the back-up battery 113 is activated to provide power the first TCU 112, e.g., by a switch closing to complete the circuit with the back-up battery 113 when received voltage from the power supply 118 drops below the threshold.

The power supply 118 can be inactive, i.e., may stop providing or fail to provide electricity to the telematics subsystem 111. For example, the power supply 118 can be inactive by short-circuiting to ground. The first TCU 112 may be programmed to determine the status of the power supply 118. For example, the first TCU 112 determines the power supply 118 is active when the first TCU 112 receives power from the power supply 118. When the first TCU 112 does not receive power from the power supply 118, the first TCU 112 may determine the status of the power supply 118 based on a message from the second TCU 114. The first TCU 112 identifies the power supply 118 is inactive by, e.g., requesting acknowledgement from the second TCU 114 that the second TCU 114 is receiving power, and if the first TCU 112 does not receive acknowledgment, the first TCU 112 determines the power supply 118 is inactive. The first TCU 112 then transmits data indicating the power supply 118 is inactive to the vehicle computer 110. Conversely, if the first TCU 112 receives acknowledgment from the second TCU 114, the first TCU 112 determines the power supply 118 is active. In this case, the first TCU 112 is inactive, and the second TCU 114 may, for example, transmit data indicating the first TCU 112 is inactive to the vehicle computer 110. Alternatively, the first TCU 112 can transmit data indicating the first TCU 112 is inactive to the vehicle computer 110, e.g., while being powered by the back-up battery 113.

The vehicle network 119 can be inactive, i.e., fail to allow communication between vehicle components 130 and/or systems. For example, the vehicle network 119 can be made inactive by short-circuiting to ground. As another example, the vehicle network 119 can be made inactive by short-circuiting to the vehicle battery. The first TCU 112 can determine the status of the vehicle network 119 based on a message from the second TCU 114 and a message from the ECG 116. The first TCU 112 identifies the vehicle network 119 is inactive by, e.g., requesting acknowledgement from the second TCU 114 and the ECG 116, if the first TCU 112 does not receive acknowledgment from either the second TCU 114 or the ECG 116, the first TCU 112 determines the vehicle network 119 is inactive. Conversely, if the first TCU 112 receives acknowledgment from either the second TCU 114 or the ECG 116, the first TCU 112 determines the vehicle network 119 is active. The first TCU 112 can then transmit data indicating the status of the vehicle network 119 to the vehicle computer 110.

The second TCU 114 can be inactive, i.e., stop communicating with the first TCU 112 via the vehicle network 119. For example, the second TCU 114 can be inactive as a result of a short-circuit to ground. The first TCU 112 can determine the status of the second TCU 114 based on a message from the second TCU 114. The first TCU 112 identifies the second TCU 114 is inactive by, e.g., requesting acknowledgement from the second TCU 114, if the first TCU 112 does not receive acknowledgment from the second TCU 114, the first TCU 112 determines the second TCU 114 is inactive. Conversely, if the first TCU 112 receives acknowledgment from the second TCU 114, the first TCU 112 determines the second TCU 114 is active. The first TCU 112 can then transmit data indicating the status of the vehicle network 119 to the vehicle computer 110.

The ECG 116 can be inactive, i.e., stop communicating or fail to communicate with the first TCU 112 via the vehicle network 119. For example, the ECG 116 can be inactive by short-circuiting to ground. The first TCU 112 can determine the status of the ECG 116 based on a message from the ECG 116. The first TCU 112 identifies the ECG 116 is inactive by, e.g., requesting acknowledgement from the ECG 116, if the first TCU 112 does not receive acknowledgment from the ECG 116, the first TCU 112 determines the ECG 116 is inactive. Conversely, if the first TCU 112 receives acknowledgment from the ECG 116, the first TCU 112 determines the ECG 116 is active. The first TCU 112 can then transmit data indicating the status of the vehicle network 119 to the vehicle computer 110.

The vehicle computer 110 is programmed to determine a risk condition based on the status of the telematics subsystem 111. For example, the vehicle computer 110 may determine the risk condition based on the statuses of each of the first TCU 112, the power supply 118, the second TCU 114, the ECG 116, and the vehicle network 119, as shown in Table 1 above. In this situation, the vehicle computer 110 transmits data indicating the risk condition, e.g., risk condition with a value of 1, risk condition with a value of 2, etc., to the TCUs 112, 114. At least one TCU 112, 114 then transmits the data indicating the risk condition to the server 140, e.g., via the network 135.

The vehicle computer 110 may be programmed to actuate vehicle components 130 to perform a countermeasure based on the risk condition. For example, when the risk condition is a risk condition having a value of 2 or higher (continuing the example of Table 1), the vehicle computer 110 may actuate at least one of a steering component 130, a brake component 130, and a propulsion component 130 to control the vehicle 105 to, e.g., direct the vehicle 105 to a parking location, halt the vehicle 15 at a roadside, i.e., stopping the vehicle 105 outside active lanes of traffic, stop the vehicle 105 in the current roadway lane, etc. When the risk condition is a risk condition having a value of 1, the vehicle computer 110 is programmed to actuate vehicle components 130 to continue normal operation of the vehicle 105, i.e., operate the vehicle along the roadway. That is, the vehicle computer 110 does not perform a countermeasure when the risk condition is a risk condition with a value of 1.

Figure 2:
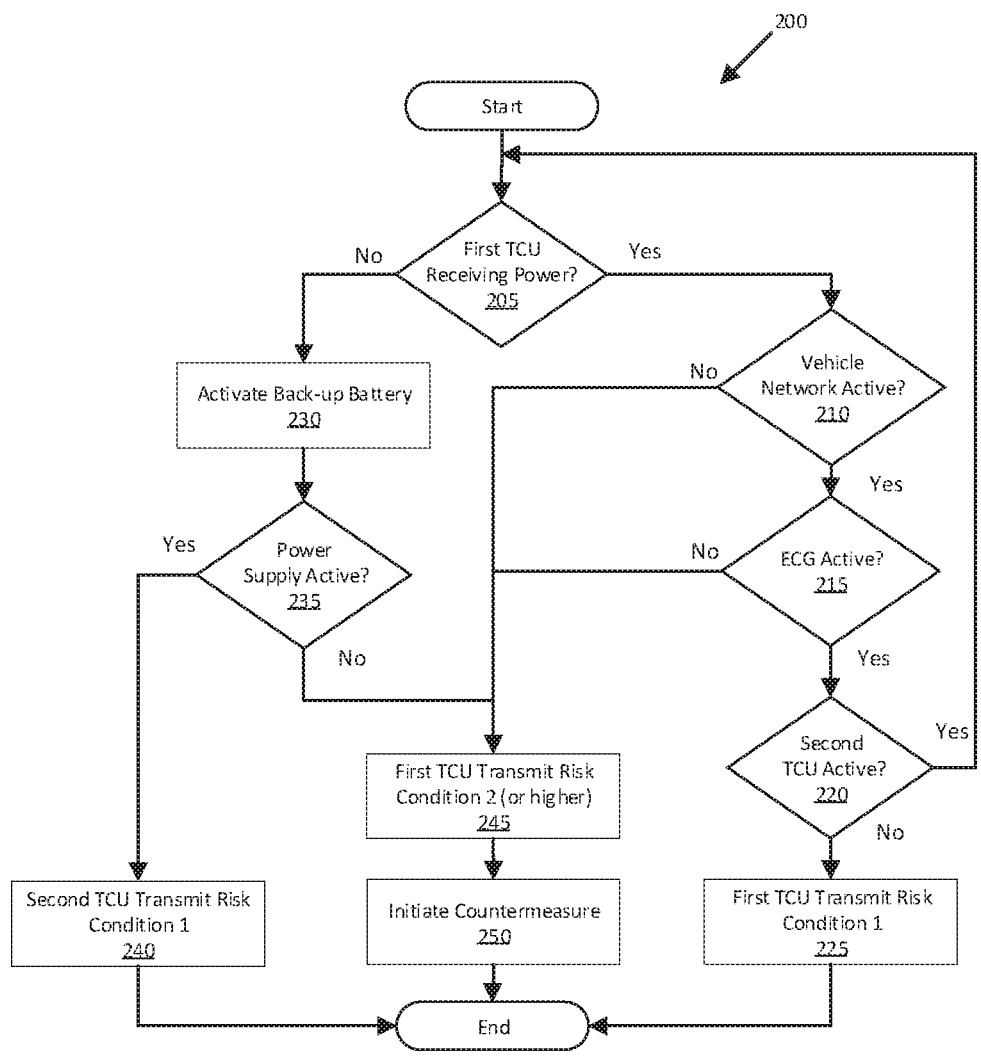
FIG. 2 is a flow chart of an exemplary process to determine a risk condition in the vehicle telematics subsystem.

FIG. 2 illustrates a process 200 that can be implemented in the vehicle computer 110 to determine a risk condition based on the statuses of the components of the telematics subsystem 111. The process 200 starts in a block 205.

In the block 205, the first TCU 112 determines whether the first TCU 112 is receiving power from the power supply 118. For example, the first TCU 112 can detect a voltage from the power supply 118 and can compare the voltage to the threshold. In the case that the voltage is at or above the threshold, the first TCU 112 determines the first TCU 112 is receiving power from the power supply 118. Conversely, in the case that the voltage is below the threshold, the first TCU 112 determines that the first TCU 112 is not receiving power from the power supply 118. In the case that first TCU 112 is receiving power from the power supply 118, the process 200 continues in a block 210. Otherwise, the process 200 continues in a block 230.

In the block 210, the first TCU 112 determines whether the vehicle network 119 is active based on a message from at least one of the second TCU 114 or the ECG 116. For example, the first TCU 112 transmits messages to the second TCU 114 and the ECG 116 requesting acknowledgement. In the case that the first TCU 112 does not receive acknowledgement from either the second TCU 114 or the ECG 116, the first TCU 112 determines the vehicle network 119 is inactive. In the case that the first TCU 112 receives acknowledgement from either the second TCU 114 or the ECG 116, the first TCU 112 determines the vehicle network 119 is active. The first TCU 112 then transmits data indicating the status of the vehicle network 119 to the vehicle computer 110. In the case that the vehicle network 119 is active, the process 200 continues in a block 215. Otherwise, the process 200 continues in the block 245.

In the block 215, the first TCU 112 determines whether the ECG 116 is active based on a message from the ECG 116. For example, the first TCU 112 transmits a message to the ECG 116 requesting acknowledgement. In the case that the first TCU 112 does not receive acknowledgement from the ECG 116, the first TCU 112 determines the ECG 116 is inactive. In the case that the first TCU 112 receives acknowledgement from the ECG 116, the first TCU 112 determines the ECG 116 is active. The first TCU 112 then transmits data indicating the status of the ECG 116 to the vehicle computer 110, e.g., via the vehicle network 119. In the case that the ECG 116 is active, the process 200 continues in a block 220. Otherwise, the process 200 continues in the block 245.

In the block 220, the first TCU 112 determines whether the second TCU 114 is active based on a message from the second TCU 114. For example, the first TCU 112 transmits a message to the second TCU 114 requesting acknowledgement. In the case that the first TCU 112 does not receive acknowledgement from the second TCU 114, the first TCU 112 determines the second TCU 114 is inactive. In the case that the first TCU 112 receives acknowledgement from the second TCU 114, the first TCU 112 determines the second TCU 114 is active. The first TCU 112 then transmits data indicating the status of the second TCU 114 to the vehicle computer 110, e.g., via the vehicle network 119. In the case that the second TCU 114 is active, the process 200 returns to the block 205. Otherwise, the process 200 continues in a block 225.

In the block 225, the first TCU 112 transmits data indicating a risk condition with a value of 1 to the server 140. Upon receiving data indicating the second TCU 114 is inactive, the vehicle computer 110 can determine a risk condition with a value of 1 for the telematics subsystem 111 (continuing the example of Table 1 above). The vehicle computer 110 then transmits data indicating the value of the risk condition to the first TCU 112, e.g., via the vehicle network 119, and the first TCU 112 transmits the data to the server 140, e.g., via the network 135. In this situation, the vehicle computer 110 is programmed to continue normal operation of the vehicle 105, i.e., not initiate a countermeasure. The process 200 ends after the block 225.

In the block 230, the back-up battery 113 is activated. The back-up battery 113 is activated by any suitable manner, e.g., a switch closing to complete the circuit with the back-up battery 113 when the power supply 118 voltage is below the threshold. The back-up battery 113 provides power to operate the first TCU 112 when the first TCU 112 does not receive power from the power supply 118. The process 200 continues in a block 235.

In the block 235, the first TCU 112 determines whether the power supply 118 is active. The first TCU 112 can determine the status of the power supply 118 from a message from the second TCU 114. For example, the first TCU 112 can transmit a message to the second TCU 114 requesting acknowledgement that the second TCU 114 is receiving power from the power supply 118. In the case that the first TCU 112 receives acknowledgement from the second TCU 114, the first TCU 112 can determine the power supply 118 is active. In this situation, the first TCU 112 is inactive, and one of the first TCU 112 and the second TCU 114 can transmit data indicating the statuses of the first TCU 112 and the power supply 118 to the vehicle computer 110, e.g., via the vehicle network 119. Conversely, in the case that the first TCU 112 does not receive acknowledgement from the second TCU 114, the first TCU 112 can determine the power supply 118 is inactive. The first TCU 112 then transmits data indicating the status of the power supply 118 to the vehicle computer 110, e.g., via the vehicle network 119. In the case that the power supply 118 is active, the process 200 continues in a block 240. Otherwise, the process 200 continues in a block 245.

In the block 240, the second TCU 114 transmits data indicating a risk condition with a value of 1 to the server 140. Upon receiving data indicating the first TCU 112 is inactive, the vehicle computer 110 can determine a risk condition with a value of 1 for the telematics subsystem 111 (continuing the example of Table 1 above). The vehicle computer 110 then transmits data indicating the value of the risk condition to the second TCU 114, e.g., via the vehicle network 119, and the second TCU 114 transmits the data to the server 140, e.g., via the network 135. In this situation, the vehicle computer 110 is programmed to continue normal operation of the vehicle 105, i.e., not initiate a countermeasure. The process 200 ends after the block 240.

In the block 245, the first TCU 112 transmits data indicating a risk condition with a value of 2 or higher to the server 140. Upon receiving data indicating at least one of the power supply 118, the vehicle network 119, and the ECG 116 is inactive, the vehicle computer 110 determines a risk condition with a value of 2 or higher for the telematics subsystem 111 (continuing with the example of Table 1 above). The vehicle computer 110 then transmits data indicating the value of the risk condition to the first TCU 112, e.g., via the vehicle network 119, and the first TCU 112 transmits the data to the server 140, e.g., via the network 135. The process 200 continues in a block 250.

In the block 250, the vehicle computer 110 is programmed to initiate a countermeasure. For example, the vehicle computer 110 may be programmed to actuate one or more vehicle components 130 to operate the vehicle 105. The vehicle computer 110 may operate the vehicle 105 based on the value of the risk condition. That is, the vehicle computer 110 can initiate different countermeasures for different values of the risk condition. For example, the vehicle computer 110 may be programmed to actuate vehicle components 130 to, e.g., direct the vehicle 105 to a parking location when the risk condition has a value of 2, halt the vehicle 105 at a roadside, i.e., stopping the vehicle 105 outside active lanes of traffic, when the risk condition has a value of 3, stop the vehicle 105 in the current roadway lane when the risk condition has a value of 4, etc. The process 200 ends after the block 250.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
   determining a status of a power supply of a first telematics control unit (TCU) as one of active or inactive, the first TCU being programmed to communicate with a server via a network;
   determining a status of a second TCU in communication with the first TCU via a vehicle network, the second TCU being programmed to communicate with the server via the network; and
   determining a risk condition based on the statuses of the power supply and the second TCU, wherein the risk condition is a measure of severity of an inactive status.

2. The method of claim 1, wherein the first TCU includes a back-up battery, and further comprising, upon detecting the power supply is inactive, activating the back-up battery.

3. The method of claim 1, further comprising determining the status of the second TCU from a message from the second TCU.

4. The method of claim 1, further comprising determining a status of the vehicle network and determining the risk condition further based on the status of the vehicle network.

5. The method of claim 4, further comprising determining the status of the vehicle network from a message from the second TCU.

6. The method of claim 1, further comprising determining a status of an enhanced central gateway (ECG) in communication with the first TCU via the vehicle network and determining the risk condition further based on the status of the ECG, the ECG is programmed to facilitate communication between multiple communication protocols via the vehicle network.

7. The method of claim 6, further comprising determining the status of the ECG from a message from the ECG.

8. The method of claim 1, further comprising transmitting data indicating the risk condition to the server via one of the first TCU or the second TCU.

9. The method of claim 1, further comprising actuating vehicle components based on the risk condition.

10. The method of claim 1, further comprising determining a status of two or more TCUs in communication with the first TCU via the vehicle network based on a message from the respective TCU, each TCU being programmed to communicate with the server.

11. A system, comprising a computer including a processor and a memory, the memory storing instructions executable by the processor to:
   determine a status of a power supply of a first telematics control unit (TCU) as one of active or inactive, the first TCU being programmed to communicate with a server;
   determine a status of a second telematics control unit (TCU) in communication with the first TCU via a vehicle network, the second TCU being programmed to communicate with the server; and
   determine a risk condition based on the statuses of the power supply and the second TCU, wherein the risk condition is a measure of severity of an inactive status.

12. The system of claim 11, wherein the first TCU includes a back-up battery, and the instructions further include instructions to, upon detecting the power supply is inactive, activate the back-up battery.

13. The system of claim 11, wherein the instructions further include instructions to determine the status of the second TCU from a message from the second TCU.

14. The system of claim 11, wherein the instructions further include instructions to determine a status of the vehicle network and determine the risk condition further based on the status of the vehicle network.

15. The system of claim 14, wherein the instructions further include instructions to determine the status of the vehicle network from a message from the second TCU.

16. The system of claim 11, wherein the instructions further include instructions to determine a status of an enhanced central gateway (ECG) in communication with the first TCU via the vehicle network and determine the risk condition further based on the status of the ECG, the ECG is programmed to facilitate communication between multiple communication protocols via the vehicle network.

17. The system of claim 16, wherein the instructions further include instructions to determine the status of the ECG from a message from the ECG.

18. The system of claim 11, wherein the instructions further include instructions to transmit data indicating the risk condition to the server via one of the first TCU or the second TCU.

19. The system of claim 11, wherein the instructions further include instructions to actuate vehicle components based on the risk condition.

20. The system of claim 11, wherein the instructions further include instructions to determine a status of two or more TCUs in communication with the first TCU via the vehicle network based on a message from the respective TCU, each TCU being programmed to communicate with the server.

* * * * *